(12) United States Patent
Tahara

(10) Patent No.: US 8,654,505 B2
(45) Date of Patent: Feb. 18, 2014

(54) CHIP ELECTRONIC DEVICE

(75) Inventor: Mikio Tahara, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 86 days.

(21) Appl. No.: 13/474,099

(22) Filed: May 17, 2012

(65) Prior Publication Data

US 2013/0128411 A1 May 23, 2013

(30) Foreign Application Priority Data

May 26, 2011 (JP) .................................. 2011-118205

(51) Int. Cl.
*H01G 4/06* (2006.01)

(52) U.S. Cl.
USPC ...................................................... 361/321.2

(58) Field of Classification Search
USPC ........... 361/321.2, 321.1, 303–305, 311–313, 361/306.1, 306.3, 301.2, 301.4, 308.1
See application file for complete search history.

(56) References Cited

U.S. PATENT DOCUMENTS

| | | | | |
|---|---|---|---|---|
| 7,061,748 B2 * | 6/2006 | Ito et al. | ................... | 361/321.4 |
| 7,626,803 B2 * | 12/2009 | Okamatsu et al. | ......... | 361/321.4 |
| 7,635,519 B2 * | 12/2009 | Onoue et al. | ............... | 428/411.1 |
| 8,009,408 B2 * | 8/2011 | Matsuda et al. | ........... | 361/321.4 |
| 8,035,950 B2 * | 10/2011 | Kusano et al. | ............. | 361/306.3 |
| 8,259,434 B2 * | 9/2012 | Kim et al. | ................... | 361/321.2 |
| 8,345,405 B2 * | 1/2013 | Jeong et al. | ................... | 361/311 |

FOREIGN PATENT DOCUMENTS

JP          2008-28064 A          2/2008

\* cited by examiner

*Primary Examiner* — Nguyen T Ha
(74) *Attorney, Agent, or Firm* — Chen Yoshimura LLP

(57) ABSTRACT

Provided is a chip electronic device that has an increased reliability with a small size. A chip electronic component has a main body made of a ceramic having an internal electrode therein. Provided on the main body is an external electrode that is made of a first electrode layer on the main body, a conductive protective layer on the first electrode layer, and a second electrode layer on the conductive protective layer formed by electrolytic plating. The conductive protective layer prevents hydrogen from diffusing into the main body during the electrolytic plating.

16 Claims, 7 Drawing Sheets

| Working example | Pd content [%] | Cu content [%] | Au content [%] | Hydrogen storage capacity [mol/m$^3$] | Hydrogen diffusion coefficient [m$^2$/sec] |
|---|---|---|---|---|---|
| 1 | 25 | 45 | 30 | 230 | 1.0 |
| 2 | 30 | 60 | 10 | 250 | 0.8 |
| 3 | 40 | 50 | 10 | 320 | 4.0 |
| 4 | 45 | 50 | 5 | 300 | 6.5 |
| 5 | 50 | 45 | 5 | 350 | 5.5 |
| 6 | 50 | 50 | 0 | 850 | 5.0 |
| 7 | 55 | 35 | 10 | 1100 | 0.5 |

| | Protective layer composition | Degree of product degradation |
|---|---|---|
| Working example 1 | Pd25%-Cu45%-Au30% | ○ |
| Working example 2 | Pd30%-Cu60%-Au10% | ○ |
| Working example 3 | Pd40%-Cu50%-Au10% | ○ |
| Working example 4 | Pd45%-Cu50%-Au5% | ○ |
| Working example 5 | Pd50%-Cu45%-Au5% | ○ |
| Working example 6 | Pd50%-Cu50%-Au0% | ○ |
| Working example 7 | Pd55%-Cu35%-Au10% | ○ |
| Comparison example | Pd0%-Cu100%-Au0% | ○ |

CHIP ELECTRONIC DEVICE

This application claims the benefit of Japanese Application No. 2011-118205, filed in Japan on May 26, 2011, which is hereby incorporated by reference in its entirety.

BACKGROUND OF THE INVENTION

1. Field of the Invention

The present invention relates to a chip electronic component such as a multi-layer ceramic capacitor, and more particularly, to a structure of an external electrode thereof.

2. Description of Related Art

A chip electronic component such as a multi-layer ceramic capacitor generally includes a cuboid main body and an external electrode. The main body has internal electrodes therein. The external electrode is formed on an outer surface of the main body, and is electrically connected to the internal electrodes. A shape, a quantity, and a forming position of the external electrode vary depending on a type of the chip electronic component. In a typical multi-layer ceramic capacitor, for example, the external electrodes are formed on two end surfaces of the cuboid main body, partially covering side surfaces that are adjacent to these end surfaces. As a typical method for forming the external electrode, the following method is known: coating the surface of the main body with a paste that is mainly made of Cu, Ni, Ag, or the like by a dipping method; firing the main body with the paste; and forming a single or a plurality of plating layers by electrolytic plating (Patent Document 1). The plating layers are provided for improving wettability and preventing solder from dissolving the electrode. As a specific example of such plating layers, an Ni film may be formed on the electrode layer that has been formed by paste coating and firing, and the Sn film may be formed on the Ni film in which the Ni film is for preventing the solder from dissolving the electrode, and the Sn film is for improving the solder wettability and for preventing oxidation of the Ni film.

RELATED ART DOCUMENTS

Patent Documents

Patent Document 1: Japanese Patent Application Laid-Open Publication No. 2008-28064

SUMMARY OF THE INVENTION

However, in a conventional chip electronic component, the electrolytic plating process may cause degradation of the product reliability. That is, it is known that the electric current efficiency of plating generally does not reach 100%, and electrolysis of water in a plating solution is caused by the current that was not used for forming the plating film. Active hydrogen generated by this electrolysis of water may enter the internal electrode through the external electrode. The hydrogen occluded in the internal electrode may cause a volume expansion of the internal electrode, and the residual internal stress may affect the product reliability. This problem occurs to a greater degree when the internal electrode is made of Ni. On the other hand, due to increasing demands for smaller and thinner chip electronic components in recent years, an external electrode that is thinner and easier to microfabricate is sought after.

The present invention was made in view of such circumstances, and is aiming at providing a chip electronic component that can suppress the degradation of the reliability and that is suitable for size reduction.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, a chip electronic device according to the present invention includes a main body that has an internal electrode therein and that is made of a ceramic, and an external electrode formed on an outer surface of the main body. The external electrode includes a first electrode layer that is formed on the outer surface of the main body, a protective layer formed on an outer surface of the first electrode layer by a physical vapor deposition method or a chemical vapor deposition method, and a second electrode layer formed on an outer surface of the protective layer by the electrolytic plating. The protective layer is provided for preventing hydrogen from entering the main body. The second electrode layer has one or more layers.

In another aspect, the present invention provides a method for forming a chip electronic device, the method including: preparing a main body that is made of a ceramic and that has an internal electrode therein; forming a first electrode layer on an outer surface of the main body; forming a conductive protective layer on an outer surface of the first electrode layer by physical vapor deposition or chemical vapor deposition, the conductive protective layer substantially preventing hydrogen from diffusing into the main body form an exterior during electrolytic plating to be performed thereafter; and forming a second electrode layer on an outer surface of the conductive protective layer by electrolytic plating, the second electrode layer being made of one or more layers.

According to the present invention, by having the protective layer, it becomes possible to prevent active hydrogen from entering the main body during a step of forming the second electrode layer by the electrolytic plating. The protective layer is formed by a physical vapor deposition method or a chemical vapor deposition method, which is desirable because such a method does not cause active hydrogen to enter the main body during the step of forming the protective layer. Also, by using the physical vapor deposition method or the chemical vapor deposition method for the film formation, the conductive protective layer can be made thinner as compared with the dipping method and the like, which is advantageous in reducing the component size.

The protective layer is preferably made of first metal grains having a higher hydrogen storage capacity than that of Ni and second metal grains having a lower hydrogen diffusion coefficient than that of Ni. That is, in order to prevent hydrogen from entering the main body, it is preferable that the protective layer itself be capable of absorbing hydrogen while preventing hydrogen from diffusing into the underlying first electrode layer. This means that the protective layer preferably has both a high hydrogen storage capacity and a low hydrogen diffusion coefficient, however, it is difficult to achieve such characteristics with a single metal material alone. Therefore, in the present invention, the protective layer is made of the first metal grains having a higher hydrogen storage capacity than that of Ni and the second metal grains having a lower hydrogen diffusion coefficient than that of Ni. The protective layer may be an alloy of the first metal grains and the second metal grains, or may be a mixture of the respective metals where free grains thereof are mixed while retaining the respective characteristics. The first metal grain and the second metal grain may include a plurality of kinds of metal materials, respectively. The first metal grains can be made of Pd, and the second metal grains can be made of Cu and Au, for example.

As described above, according to the present invention, by having the protective layer, the entrance of active hydrogen into the main body during the step of forming the second electrode layer by the electrolytic plating can be prevented. The protective layer is formed by a physical vapor deposition method or a chemical vapor deposition method, which is desirable because such methods do not cause active hydrogen to enter the main body during the step of forming the protective layer. Also, because the conductive protective layer is formed by the physical vapor deposition method or the chemical vapor deposition method, the present invention is advantageous in reducing the component size.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Figure 1:
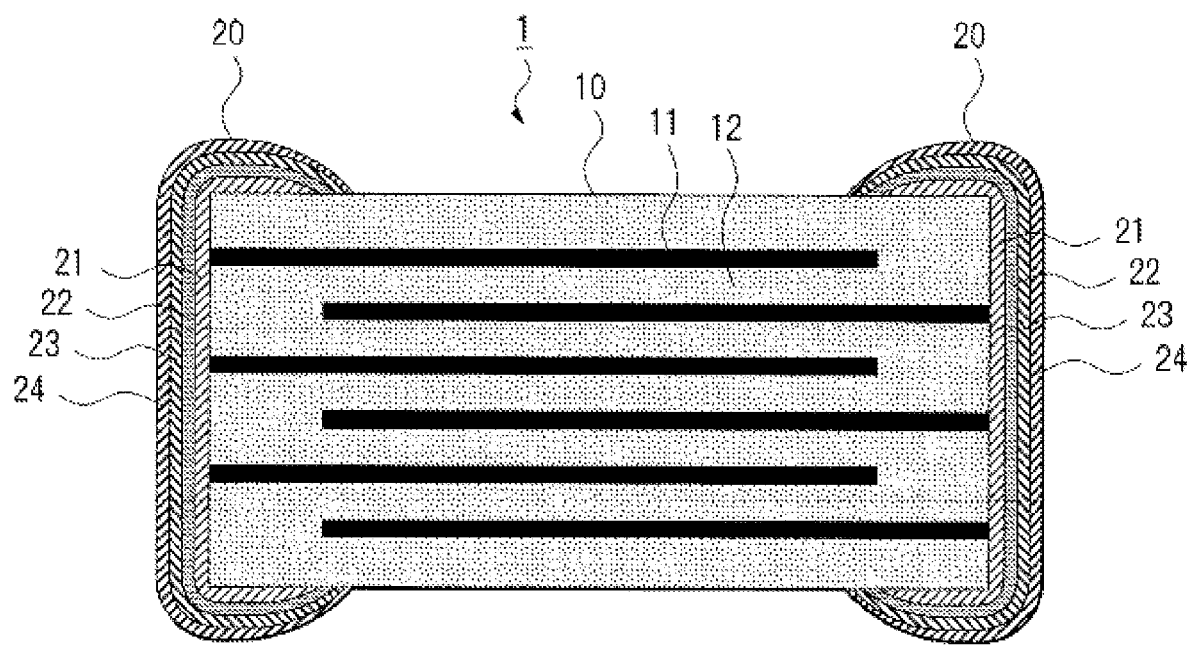
FIG. 1 is a cross-sectional diagram of a multi-layer ceramic capacitor.

A chip electronic component according to one embodiment of the present invention will be described with reference to figures. In this embodiment, a multi-layer ceramic capacitor will be explained as an example of the chip electronic component. FIG. 1 is a cross-sectional diagram of a multi-layer ceramic capacitor. It should be noted that dimensions and shapes are appropriately simplified in this application for ease of explanation.

As shown in FIG. 1, a multi-layer ceramic capacitor 1 includes a substantially cuboid laminate 10 as a main body, and a pair of external electrodes 20 formed on two end surfaces of the laminate 10 in a longitudinal direction.

The laminate 10 is made of a sintered ceramic body in which a plurality of internal electrode layers 11 and dielectric layers 12 are laminated alternately. The internal electrode layers 11 are disposed so as to overlap each other with a prescribed spacing therebetween. The respective ends of the internal electrode layers 11 are alternately exposed to one of the end surfaces of the laminate 10, and are electrically connected to the external electrodes 20 at the respective end surfaces. That is, the respective internal electrode layers 11 on every other layer are connected to the same external electrode 20. The internal electrode layers 11 are made of a metal that mainly contains a base metal such as Ni or Cu, a precious metal such as Pd or Ag, an Ag—Pd alloy, or the like. It is preferable to use Ni from the perspective of cost reduction. In this embodiment, the multi-layer ceramic capacitor 1 is a high dielectric constant Class 2 capacitor, and the dielectric layers 12 are made of a barium titanate based dielectric ceramic.

The external electrodes 20 are formed on the surface of the laminate 10 so as to cover the two end surfaces in the longitudinal direction and part of side surfaces adjacent to these end surfaces. The external electrode 20 has a four-layer structure made of an electrode layer 21 that is formed as the innermost layer, which is formed on the outer surface of the laminate 10, a protective layer 22 formed on an outer surface of the first electrode layer 21, and two plating layers 23 and 24 formed on an outer surface of the protective layer 22.

The electrode layer 21 is a layer provided for performing a main function of the external electrodes 20, and therefore, in selecting a material for the electrode layer 21, it is preferable to take into account electrical characteristics, the connectivity with the internal electrode layers 11, the adhesion to the laminate 10, and the like. Specifically, it is preferable to select the material from a base metal such as Cu or Ni, a precious metal such as Ag or Au, an alloy of these metals, or the like.

The protective layer 22 is a conductive electrode layer provided for preventing active hydrogen from entering the laminate 10 during the process of forming the plating layers 23 and 24, and preferably has a high hydrogen storage capacity and a low hydrogen diffusion coefficient. In order to provide such functions, the protective layer 22 in the present invention is made of first metal grains having a high hydrogen storage capacity and second metal grains having a low hydrogen diffusion coefficient. Ni can be appropriately used as a comparison reference for the hydrogen storage capacity and the hydrogen diffusion coefficient. That is, the protective layer 22 is preferably made of first metal grains having a higher hydrogen storage capacity than that of Ni and second metal grains having a lower hydrogen diffusion coefficient than that of Ni. As the first metal grains, Pd, Pt, or the like can be used. Among them, as a content of Pd becomes higher, the hydrogen storage capacity becomes greater (capable to absorb about 900 times the volume of hydrogen atoms at room temperature), and because upon occlusion of hydrogen, a large amount of hydrogen is absorbed, a deformation due to a volume expansion and the like does not occur. That is, by using Pd as the first metal grains in the protective layer 22, the protective layer 22 can absorb hydrogen and yet is unlikely to deform. This makes it possible to prevent hydrogen from diffusing into the internal electrode layers 11, and because the protective layer 22 is not likely to expand or deform after occluding hydrogen, no stress is caused to the laminate 10. Thus, Pd is one of the materials that can be effectively used as the first metal grains. On the other hand, as the second metal grains, Cu, Au, Ag, or the like can be used. Among them, as the content of Au becomes higher, the hydrogen diffusion coefficient becomes smaller, and therefore, the second metal grains preferably contain Au in an appropriate ratio. The first metal grains and the second metal grains may include a plurality of metal materials, respectively. The protective layer 22 can be made of Pd as the first metal grains and Cu and Au as the second metal grains, for example. For the reason described above, the protective layer 22 is preferably made of Pd, Cu, and Au.

The protective layer 22 is made of a thin film formed by a dry process that includes: a physical vapor deposition method, such as sputtering, vacuum vapor deposition, or ion plating; a chemical vapor deposition method such as thermal CVD, cold wall CVD, MOCVD, ALCVD, or plasma CVD; and the like. Also, the protective layer 22 is made of a plurality of metal materials as described above. In one embodiment, the protective layer 22 may be formed by performing a vapor deposition using the respective materials as targets. In this case, the resultant protective layer 22 becomes a mixture of the respective metals in which individual grains are mixed while retaining the respective characteristics thereof. The protective layer 22 having such a mixed state may further be heated so that the mixture becomes an alloy. Alternatively, the protective layer 22 may be formed by performing a vapor deposition using an alloy of the respective materials as a target The plating layers 23 and 24 are made of thin films formed by the electrolytic plating. The plating layer 23 is provided for preventing solder from dissolving the electrodes. The plating layer 23 can be made of a material such as Ni or Ni—P, for example. The plating layer 24 is provided for improving the solder wettability and preventing the oxidation of the plating layer 23. The plating layer 24 can be made of a material such as Sn, an Sn alloy, or Au, for example.

Figure 2:
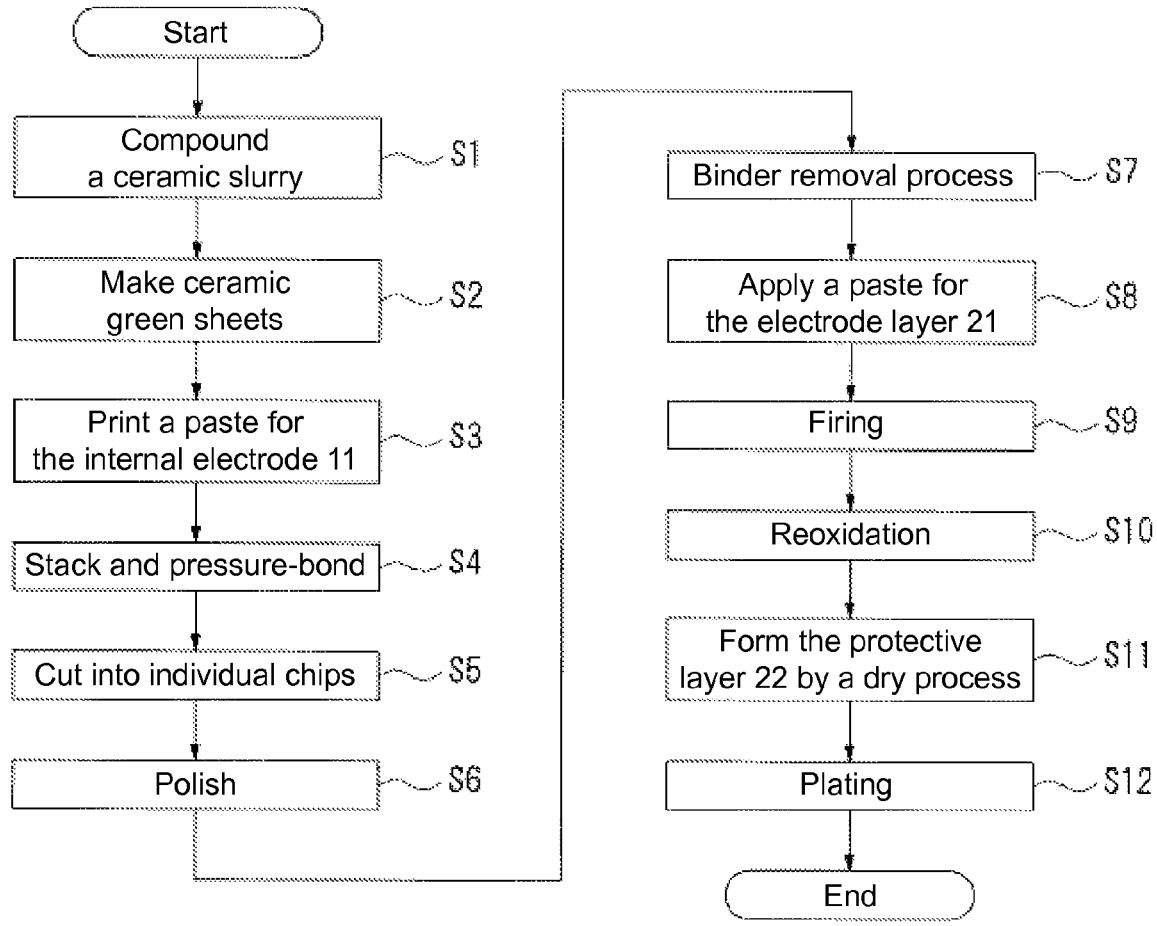
FIG. 2 is a flowchart for illustrating a method for manufacturing the multi-layer ceramic capacitor.

Next, a method for manufacturing the multi-layer ceramic capacitor 1 of this embodiment will be explained with reference to a flowchart in FIG. 2. First, a ceramic slurry is prepared by mixing raw material powders for forming a dielectric ceramic, an organic binder, a solvent, and other additives (step S1). Next, ceramic green sheets are obtained by drying the ceramic slurry casted in a sheet shape by the doctor blade method or the like (step S2). Next, a paste for the internal electrode is printed on the ceramic green sheet in a prescribed pattern (step S3). The paste preferably includes a prescribed amount of ceramic raw material powders as an additive. Next, a prescribed number of ceramic green sheets having the paste printed thereon are stacked in a prescribed manner, and are thereafter pressure-bonded, thereby obtaining a sheet laminate (step S4). Next, the sheet laminate is cut into individual chips (step S5), and thereafter, surfaces of the individual chips are polished by barrel polishing or the like (step S6). Next, the polished individual chips undergo a binder removal process in the atmosphere or in a non-oxidizing gas such as nitrogen (step S7). Next, ends of each individual chips are coated with a paste for the electrode layer 21 by a dipping method, a printing method, or the like (step S8). Next, the individual chips that underwent the binder removal process are fired at a prescribed temperature in a nitrogen/hydrogen atmosphere (step S9), and by performing a reoxidation process thereafter, the laminate 10 having the electrode layer 21 is obtained (step S10).

Next, on the electrode layer 21 of the laminate 10, the protective layer 22 is formed by a physical vapor deposition method or a chemical vapor deposition method (step S11). When sputtering is employed, for example, the laminate 10 mounted on a prescribed jig is placed on a stage of a sputtering device, and the respective metal materials constituting the protective layer 22 are set as the sputtering targets, respectively. The composition ratio of each metal material can be controlled by a voltage applied to each target and the like. The protective layer 22 made of an alloy can be obtained by heating the protective layer 22 to a temperature greater than or equal to a prescribed temperature after the sputtering, or by using an alloy of metals that will constitute the protective layer 22 as the target in the sputtering.

Next, on the protective layer 22, the plating layer 23 made of Ni and the plating layer 24 made of Sn are formed in this order by the electrolytic plating (step S12). It should be noted that, in this plating process, active hydrogen is absorbed and occluded in the protective layer 22, and therefore does not enter the laminate 10, which makes it possible to prevent the degradation of characteristics. The multi-layer ceramic capacitor 1 was fabricated by the process described above.

As described above, in the multi-layer ceramic capacitor according to this embodiment, the external electrode 20 includes the protective layer 22 that absorbs hydrogen. This makes it possible to prevent active hydrogen from entering the laminate 10 during the electrolytic plating process for forming the plating layers 23 and 24 on the outer layer side of the protective layer 22. The protective layer 22 is formed by a physical vapor deposition method or a chemical vapor deposition method, which is desirable because such a method does not cause active hydrogen to enter the laminate 10 during the step of forming the protective layer 22. Also, by employing a physical vapor deposition method or a chemical vapor deposition method for forming the conductive protective layer 22, a film thickness can be reduced as compared with the dipping method or the like, which is advantageous in reducing the component size.

One embodiment of the present invention has been described above, but the present invention is not limited to such. In the embodiment above, the multi-layer ceramic capacitor has been described as an example. However, the present invention can be implemented for other types of chip electronic components. That is, in the present invention, there is no special limitation on a material or the like of the main body, or there is no special limitation on the shape, the quantity, or the like of the external electrodes, for example.

Further, in the embodiment above, sputtering was used as an example of a physical vapor deposition method or a chemical vapor deposition method in describing the method for forming the protective layer 22. However, the present invention can be implemented by using other physical vapor deposition methods or chemical vapor deposition methods.

In the embodiment above, the paste for forming the electrode layer 21 in the external electrode 20 and the individual chip were fired at the same time, but the laminate 10 may be formed first by firing the individual chip, and the electrode layer 21 may be formed thereafter by coating the laminate with the paste and baking them.

WORKING EXAMPLES

Figures 3, 4A:
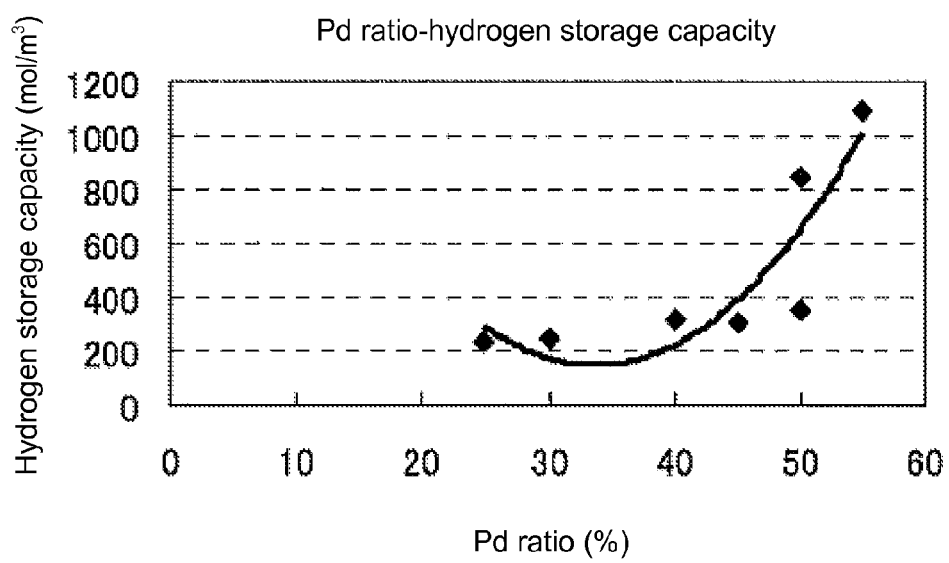
FIG. 3 is a table showing a composition, a hydrogen storage capacity, and a hydrogen diffusion coefficient of a protective layer of each working example.
FIGS. 4A through 4C are graphs respectively showing the hydrogen storage capacity of the protective layer having the respective metal content ratios.
Figure 4B:
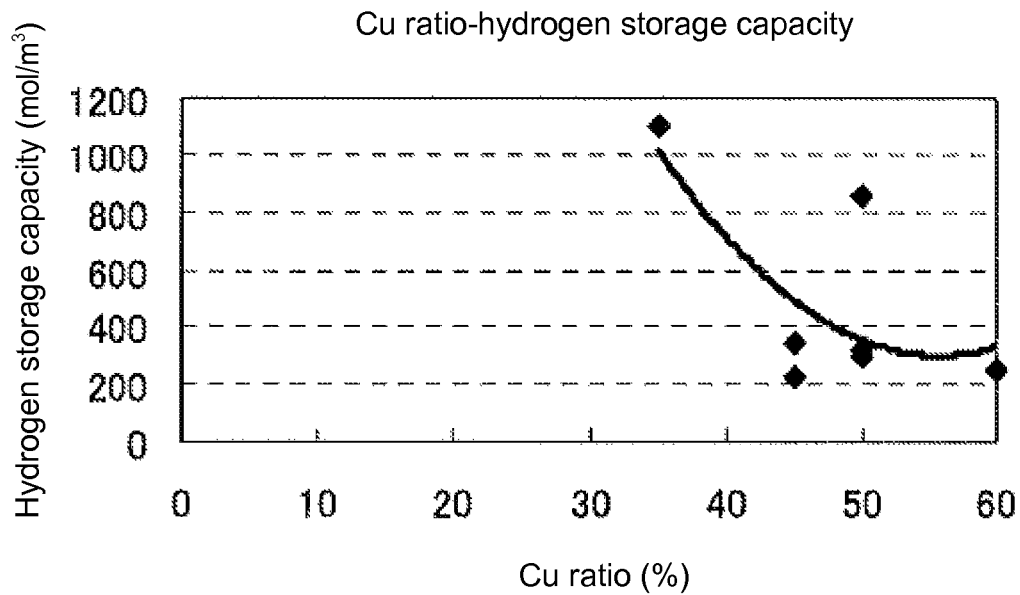
Figure 4C:
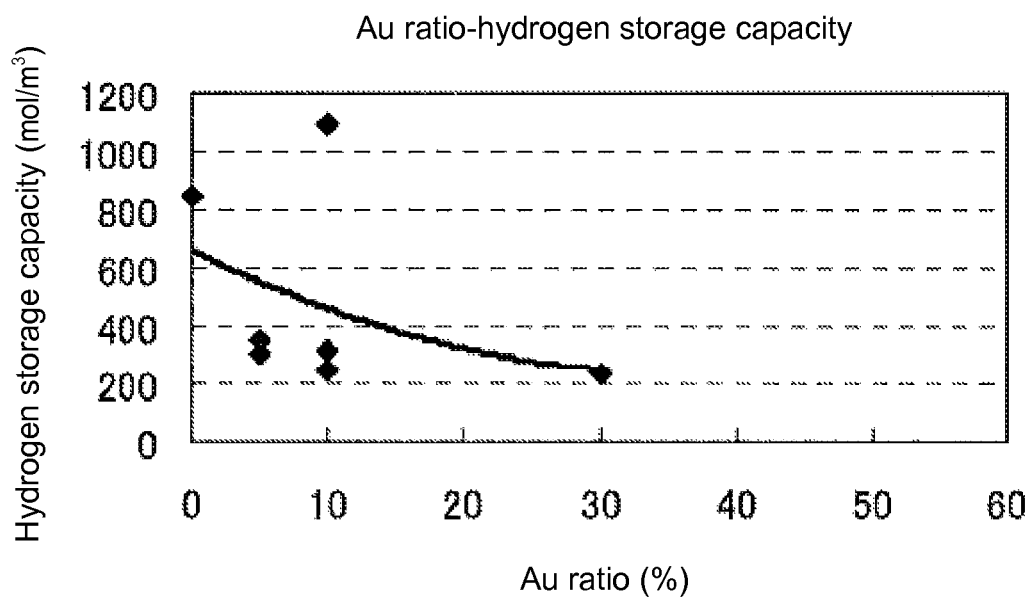

Working Examples of the present invention will be explained. The following multi-layer ceramic capacitors were prepared as Working Examples 1 to 7. In each of Working Examples 1 to 7, the internal electrode layer 11 was made of Ni, the electrode layer 21 of the external electrode 20 was made of Ni, the protective layer 22 was made of a mixture of Pd, Cu, and Au, the plating layer 23 was made of Ni, and the plating layer 24 was made of Sn. The electrode layer 21 was fired simultaneously with the laminate 10. The thickness of the protective layer 22 was set to 0.5 µm. FIG. 3 shows the content of each metal material, the hydrogen storage capacity, and the hydrogen diffusion coefficient of the protective layer 22 in each of Working Examples 1 to 7. FIGS. 4A-4C and 5A-5C respectively show graphs illustrating relationships of the hydrogen storage capacity and the hydrogen diffusion coefficient with the Pd content, the Cu content, and the Au content, respectively. It can be seen from FIGS. 4A-4C and 5A-5C that the hydrogen storage capacity increases as the Pd content becomes higher, and the hydrogen diffusion coefficient decreases as the Au content becomes lower. The protective layer 22 is effective when it does not take in much hydrogen (low diffusion coefficient), and traps hydrogen within itself when it takes in hydrogen (high hydrogen storage capacity). That is, greater effects can be achieved by combining Au that has an effect of not taking in hydrogen and Pd that has a capability of trapping hydrogen therein. In particular, the protective layer with the Au content of 10% or greater and the high Pd content is considered more preferable.

Figure 5A:
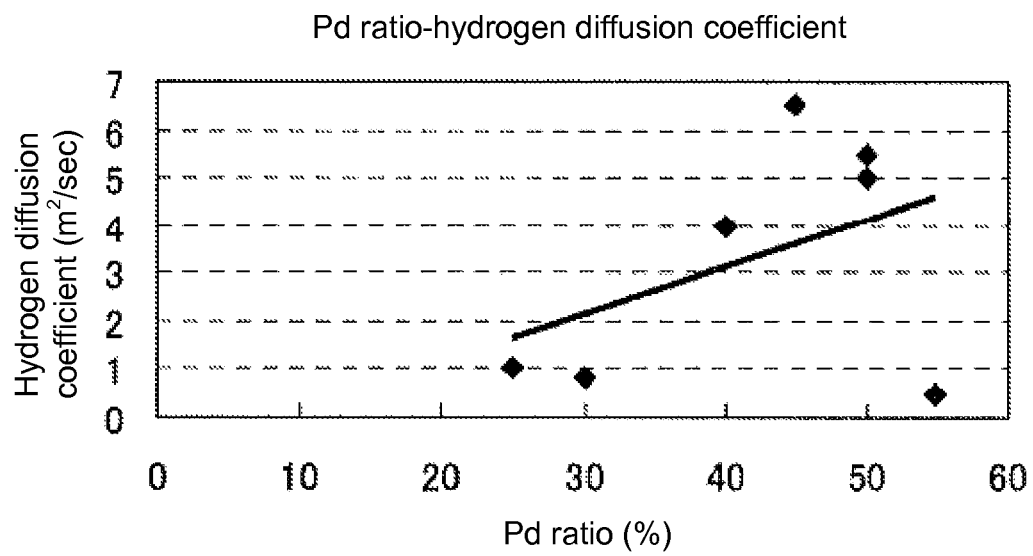
FIGS. 5A through 5C are graphs respectively showing the hydrogen diffusion coefficient of the protective layer having the respective metal content ratios.
Figure 5B:
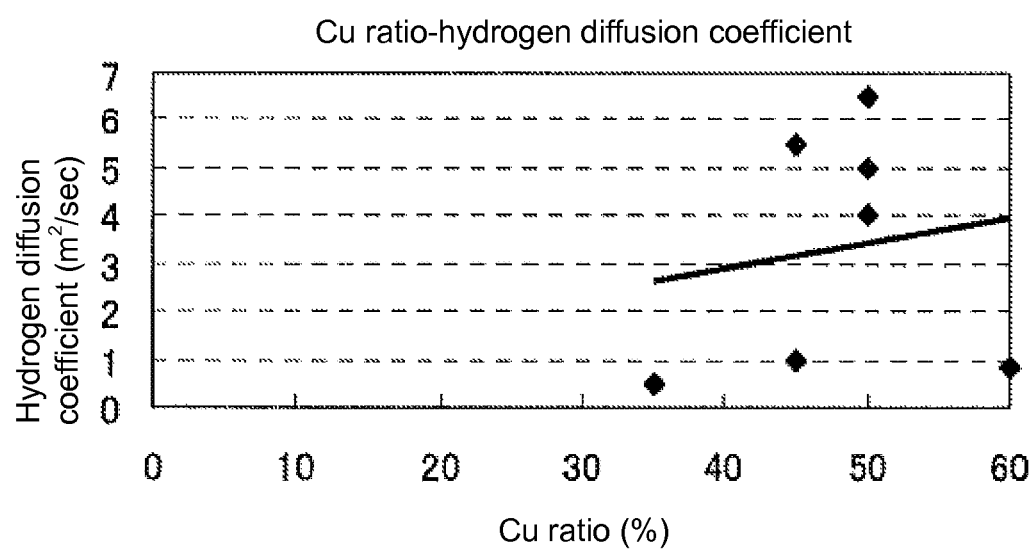
Figures 5C, 6:
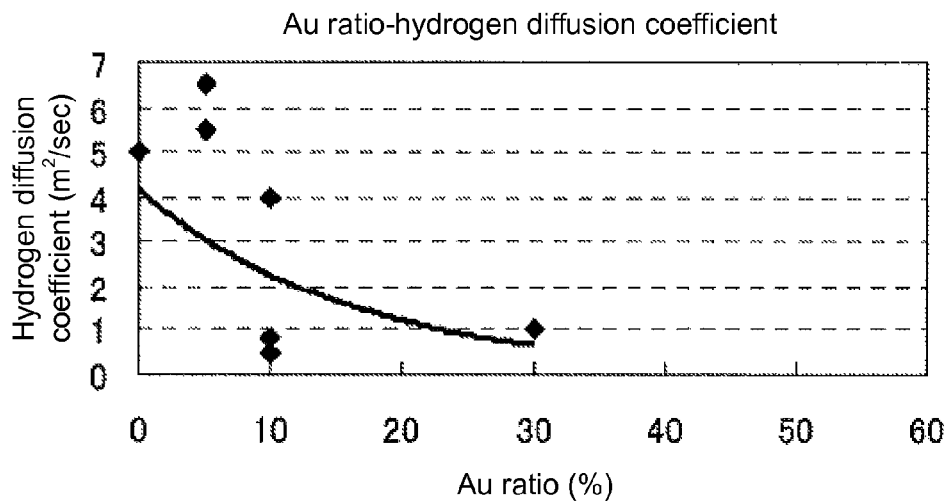
FIG. 6 is a table showing a degree of product degradation in a plating process of each working example.
Figure 7:
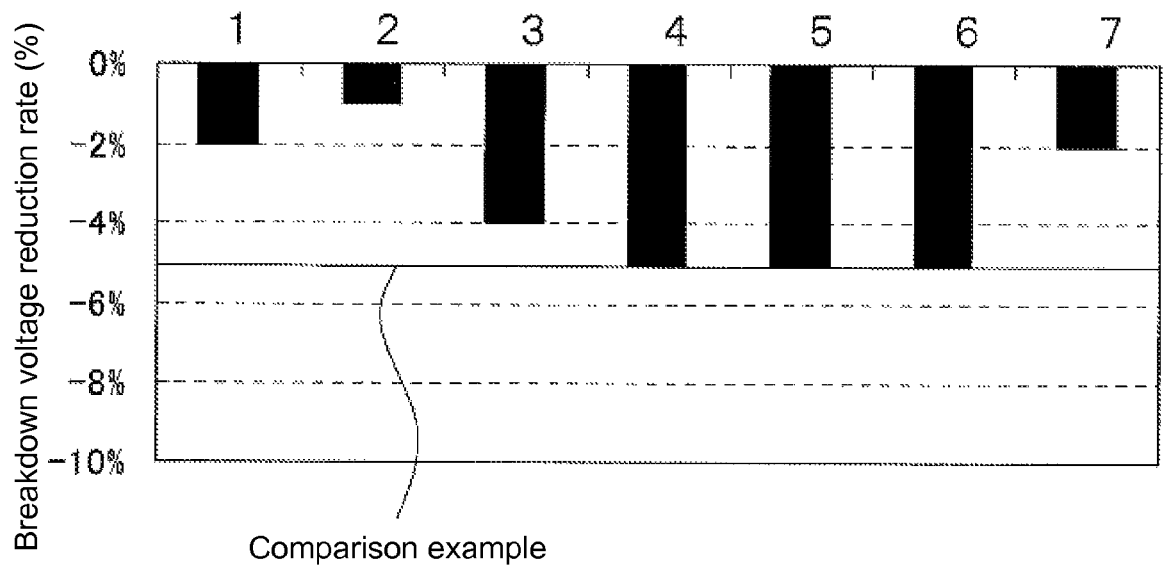
FIG. 7 is a graph showing a degree of product degradation in a plating process of each working example.

FIGS. 6 and 7 show results of a study that was conducted to confirm the degree of product degradation caused by the plating process in the respective Working Examples 1 to 7. The degree of product degradation caused by the plating process (referred to as "degradation degree" below) is defined as ((the average value of breakdown voltages before the plating process)−(the average value of the breakdown voltages after the plating process)/the average value of breakdown voltages before the plating process), where the breakdown voltages were obtained by measuring 20 pieces each before and after the plating process. FIG. 6 shows the evaluation results where the cases with the degradation degree of −5% or higher were deemed GOOD (indicated with "O" in FIG. 6). A capacitor having the protective layer 22 that was made of 100% Cu was prepared as a comparison example.

As shown in FIGS. 6 and 7, the degradation degrees became smaller in all of Working Examples 1 to 7, which confirmed the effectiveness of the present invention in suppressing the product degradation caused by the plating process. It was confirmed that the protective layer 22 with a 25-55% Pd content, a 35-60% Cu content, and a 0-30% Au content, in particular, achieves the greater effect than that of the protective layer 22 made solely of Cu, which was prepared as the comparison example. It was also confirmed that when the Au content in the product is 10-30%, the product degradation can be significantly suppressed as compared with the comparison example made solely of Cu.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two ore more of the embodiments and their modifications described above can be combined and regarded within the scope of the present invention.

What is claimed is:

1. A chip electronic device, comprising:
   a main body that is made of a ceramic and that has an internal electrode therein; and
   an external electrode formed on an outer surface of the main body, the external electrode including:
   a first electrode layer formed on the outer surface of the main body;
   a conductive protective layer formed on an outer surface of the first electrode layer by a physical vapor deposition method or a chemical vapor deposition method, the conductive protective layer substantially preventing hydrogen from diffusing into the main body form an exterior during electrolytic plating to be performed thereafter; and
   a second electrode layer formed on an outer surface of the conductive protective layer by electrolytic plating, the second electrode layer being made of one or more layers.

2. The chip electronic device according to claim 1, wherein the conductive protective layer includes first metal grains and second metal grains, the first metal grain having a higher hydrogen storage capacity than that of Ni, the second metal grain having a lower hydrogen diffusion coefficient than that of Ni.

3. The chip electronic device according to claim 2, wherein the conductive protective layer includes Pd as the first metal grains, and one or both of Cu and Au as the second metal grains.

4. The chip electronic device according to claim 3, wherein the conductive protective layer has a thickness of 0.5 μm or greater, and includes 25-55% Pd, 35-60% Cu, and 0-30% Au.

5. The chip electronic device according to claim 3, wherein the conductive protective layer has a thickness of 0.5 μm or greater, and essentially includes 25-55% Pd, 10-30% Au, and Cu in the remainder.

6. The chip electronic device according to claim 5, wherein a second electrode layer includes an Ni layer on the outer surface of the conductive protective layer formed by electrolytic plating, and an Sn layer on the Ni layer formed by electrolytic plating.

7. The chip electronic device according to claim 1, wherein the conductive protective layer includes a mixture of first metal grains and second metal grains.

8. The chip electronic device according to claim 1, wherein the conductive protective layer includes an alloy of a first metal and a second metal.

9. A method for forming a chip electronic device, comprising:
   preparing a main body that is made of a ceramic and that has an internal electrode therein;
   forming a first electrode layer on an outer surface of the main body;
   forming a conductive protective layer on an outer surface of the first electrode layer by physical vapor deposition or chemical vapor deposition, the conductive protective layer substantially preventing hydrogen from diffusing into the main body from an exterior during electrolytic plating to be performed thereafter; and
   forming a second electrode layer on an outer surface of the conductive protective layer by electrolytic plating, the second electrode layer being made of one or more layers.

10. The method according to claim 9, wherein forming the conductive protective layer includes forming first metal grains and second metal grains, the first metal grain having a higher hydrogen storage capacity than that of Ni, the second metal grain having a lower hydrogen diffusion coefficient than that of Ni.

11. The method according to claim 10, wherein the conductive protective layer includes Pd as the first metal grains, and one or both of Cu and Au as the second metal grains.

12. The method according to claim 11, wherein the conductive protective layer has a thickness of 0.5 μm or greater, and includes 25-55% Pd, 35-60% Cu, and 0-30% Au.

13. The method according to claim 11, wherein the conductive protective layer has a thickness of 0.5 μm or greater, and essentially includes 25-55% Pd, 10-30% Au, and Cu in the remainder.

14. The method according to claim 13, wherein forming a second electrode layer includes forming an Ni layer on the outer surface of the conductive protective layer by electrolytic plating, and forming an Sn layer on said Ni layer by electrolytic plating.

15. The method according to claim 9, wherein the conductive protective layer includes a mixture of first metal grains and second metal grains.

16. The method according to claim 9, wherein the conductive protective layer includes an alloy of a first metal and a second metal.

* * * * *